(12) United States Patent
Shin

(10) Patent No.: US 12,051,421 B2
(45) Date of Patent: Jul. 30, 2024

(54) METHOD FOR PRONUNCIATION TRANSCRIPTION USING SPEECH-TO-TEXT MODEL

(71) Applicant: ActionPower Corp., Seoul (KR)

(72) Inventor: Dongchan Shin, Seoul (KR)

(73) Assignee: ActionPower Corp., Seoul (KR)

( * ) Notice: Subject to any disclaimer, the term of this patent is extended or adjusted under 35 U.S.C. 154(b) by 0 days.

(21) Appl. No.: 18/540,718

(22) Filed: Dec. 14, 2023

(65) Prior Publication Data

US 2024/0212685 A1  Jun. 27, 2024

(30) Foreign Application Priority Data

Dec. 21, 2022 (KR) .......... 10-2022-0179987

(51) Int. Cl.
*G10L 15/16* (2006.01)
*G10L 15/187* (2013.01)
*G10L 15/26* (2006.01)

(52) U.S. Cl.
CPC .............. *G10L 15/26* (2013.01); *G10L 15/16* (2013.01); *G10L 15/187* (2013.01)

(58) Field of Classification Search
CPC ........ G10L 15/16; G10L 15/187; G10L 15/26
See application file for complete search history.

(56) References Cited

U.S. PATENT DOCUMENTS

| | | | |
|---|---|---|---|
| 3,265,814 A * | 8/1966 | Maeda ................... | G10L 25/00 704/235 |
| 5,526,466 A * | 6/1996 | Takizawa ............ | G10L 15/1807 704/251 |
| 6,963,837 B1 * | 11/2005 | Finke ................... | G10L 15/187 704/E15.02 |
| 8,606,560 B2 * | 12/2013 | Grenier .................. | G06F 40/58 704/251 |
| 8,959,020 B1 * | 2/2015 | Strope .................. | G10L 15/187 704/257 |
| 9,202,460 B2 * | 12/2015 | Chang .................... | G10L 15/06 |
| 9,286,888 B1 * | 3/2016 | Lee ........................ | G10L 15/06 |

(Continued)

FOREIGN PATENT DOCUMENTS

| | | | | |
|---|---|---|---|---|
| CN | 112614510 A | * | 4/2021 | |
| CN | 111145748 B | * | 9/2022 | ............. G10L 15/02 |

(Continued)

OTHER PUBLICATIONS

Lin, B., & Wang, L. (Aug. 2021). Deep Feature Transfer Learning for Automatic Pronunciation Assessment. In Interspeech (vol. 2021, pp. 4438-4442). (Year: 2021).*

(Continued)

*Primary Examiner* — Daniel C Washburn
*Assistant Examiner* — Oluwadamilola M Ogunbiyi
(74) *Attorney, Agent, or Firm* — MARSHALL, GERSTEIN & BORUN LLP

(57) ABSTRACT

Disclosed is a pronunciation transcription method performed by a computing device. The method may include: acquiring a partial audio signal of a first sound unit generated by splitting an audio signal; inputting the partial audio signal of the first sound unit into a pronunciation transcription model; and outputting a pronunciation transcription result for the partial audio signal of the first sound unit by using the pronunciation transcription model.

11 Claims, 8 Drawing Sheets

(56) References Cited

U.S. PATENT DOCUMENTS

| | | | |
|---|---|---|---|
| 9,436,951 B1* | 9/2016 | Jablokov | G06F 16/632 |
| 9,508,341 B1* | 11/2016 | Parlikar | G10L 15/18 |
| 10,607,611 B1* | 3/2020 | Shellef | G10L 15/01 |
| 11,410,639 B2 | 8/2022 | Trueba et al. | |
| 11,682,318 B2* | 6/2023 | Jochim | G09B 19/06 |
| | | | 434/157 |
| 11,887,622 B2* | 1/2024 | Hu | G10L 25/63 |
| 2005/0137862 A1* | 6/2005 | Monkowski | G10L 15/06 |
| | | | 704/E15.007 |
| 2013/0030810 A1* | 1/2013 | Kopparapu | G06F 16/954 |
| | | | 704/E13.011 |
| 2014/0046662 A1* | 2/2014 | Tyagi | G10L 15/063 |
| | | | 704/243 |
| 2015/0269930 A1* | 9/2015 | Chien | G10L 15/22 |
| | | | 704/251 |
| 2016/0188727 A1* | 6/2016 | Waibel | G06F 16/9535 |
| | | | 707/758 |
| 2017/0186421 A1* | 6/2017 | Printz | G10L 17/26 |
| 2017/0236447 A1* | 8/2017 | Stalling | G09B 19/08 |
| | | | 434/157 |
| 2019/0378495 A1 | 12/2019 | Kim et al. | |
| 2020/0090681 A1* | 3/2020 | Hu | A61B 5/4803 |
| 2020/0219486 A1 | 7/2020 | Fu et al. | |
| 2020/0357387 A1* | 11/2020 | Prabhavalkar | G06N 3/045 |
| 2020/0365141 A1 | 11/2020 | Kim et al. | |
| 2021/0050018 A1* | 2/2021 | Kim | G10L 15/183 |
| 2021/0174789 A1* | 6/2021 | Hwang | G10L 15/22 |
| 2021/0210109 A1* | 7/2021 | Weng | G10L 15/187 |
| 2021/0225366 A1* | 7/2021 | Chen | G10L 15/02 |
| 2021/0312907 A1 | 10/2021 | Moreno et al. | |
| 2021/0335340 A1* | 10/2021 | Gowayyed | G10L 15/04 |
| 2022/0108689 A1* | 4/2022 | Tripathi | G06N 3/04 |
| 2023/0419988 A1* | 12/2023 | Choi | G10L 25/51 |

FOREIGN PATENT DOCUMENTS

| | | | | |
|---|---|---|---|---|
| DE | 60022291 T2 * | 6/2006 | | G10L 15/065 |
| EP | 1818837 B1 * | 8/2009 | | G10H 1/0008 |
| JP | 2002169579 A * | 6/2002 | | |
| JP | 2009282330 A * | 12/2009 | | |
| KR | 101122590 B1 | 3/2012 | | |
| KR | 10-2012-0069969 A | 6/2012 | | |
| KR | 20130022607 A * | 3/2013 | | G06V 10/809 |
| KR | 101458581 B1 | 11/2014 | | |
| KR | 10-2020-0057291 A | 5/2020 | | |
| KR | 10-2020-0091797 A | 7/2020 | | |
| KR | 102170844 B1 | 10/2020 | | |
| KR | 102281515 B1 | 7/2021 | | |
| KR | 10-2021-0108557 A | 9/2021 | | |
| KR | 102323640 B1 | 11/2021 | | |
| KR | 102333939 B1 | 12/2021 | | |
| KR | 10-2022-0028128 A | 3/2022 | | |
| KR | 102386529 B1 | 5/2022 | | |
| WO | WO-0126092 A2 * | 4/2001 | | G10L 15/02 |
| WO | WO-2021189984 A1 * | 9/2021 | | G10L 13/02 |

OTHER PUBLICATIONS

Bruguier, Antoine, et al. "Pronunciation Learning with RNN-Transducers." Interspeech. 2017. (Year: 2017).*

Tan, Ee-Leng, Rishabh Ranjan, and S. Jayabalan. "Sound event detection and localization using ResNet RNN and time-delay DOA." Detection Classification Acoust. Scenes Events Challenge, Tech. Rep (2019). (Year: 2019).*

Kamenskaia et.al., "Automatic real-time transcription of multimedia conference, Technical university of liberec" (2018.).

Qingkai Fang et al., 'STEMM: Self-learning with Speech-text Manifold Mixup for Speech Translation', arXiv:2203.10426, Mar. 2022.

* cited by examiner

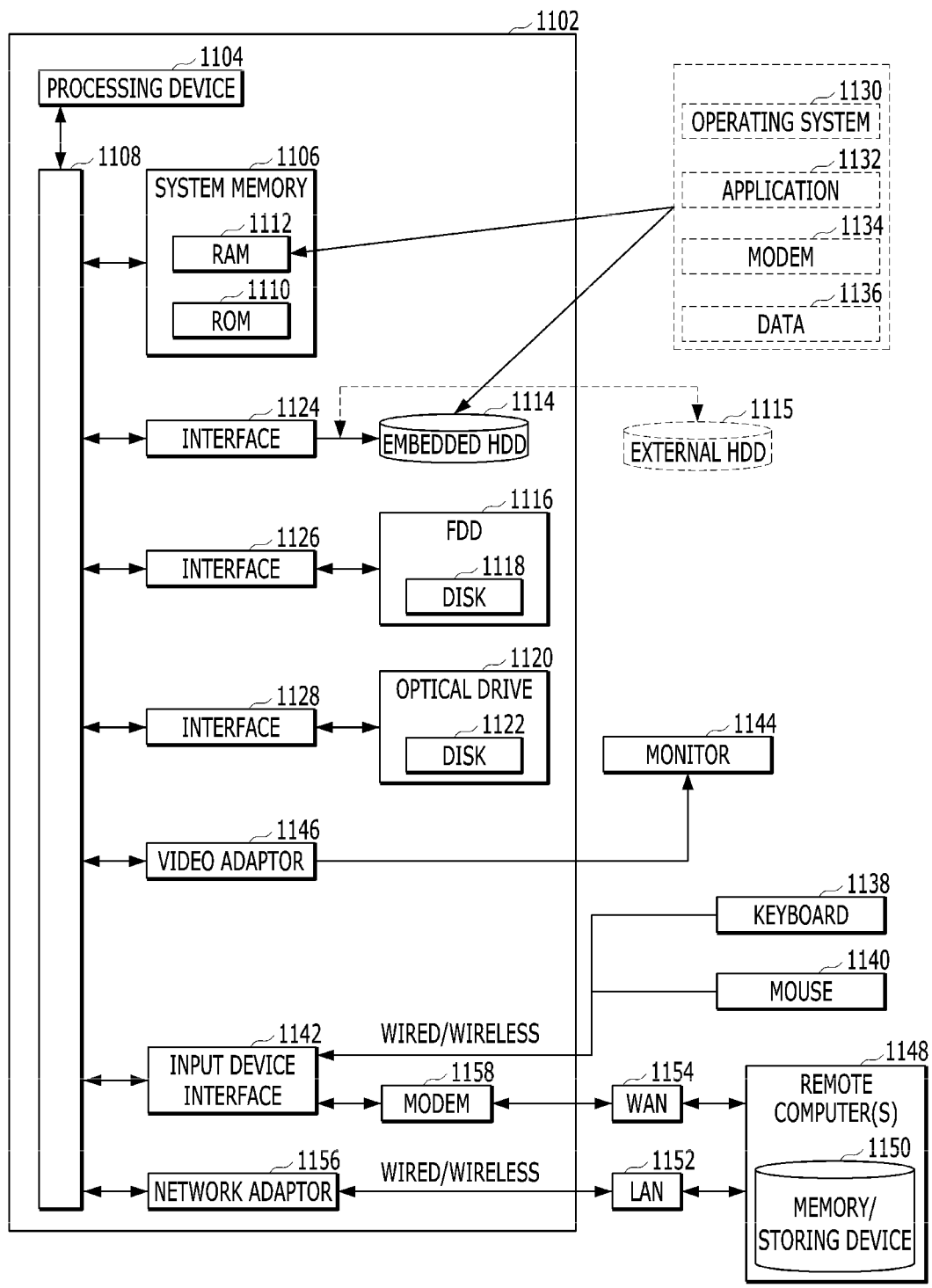

METHOD FOR PRONUNCIATION TRANSCRIPTION USING SPEECH-TO-TEXT MODEL

CROSS-REFERENCE TO RELATED APPLICATIONS

This application claims priority to and the benefit of Korean Patent Application No. 10-2022-0179987 filed in the Korean Intellectual Property Office on Dec. 21, 2022, the entire contents of which are incorporated herein by reference.

TECHNICAL FIELD

The present disclosure relates to a pronunciation transcription method, and more particularly, to a method for converting an audio signal into a text as the audio signal is pronounced.

BACKGROUND ART

Pronunciation transcription technology refers to "technology of transcribing a speech as the speech is pronounced". The pronunciation transcription technology is different from "speech recognition (STT; Speech-To-Text) technology of transcribing a speech according to spelling" in that the pronunciation transcription technology generates a text corresponding to the speech based on actual pronunciation without considering the spelling.

For example, when the speech is "아침밥", the pronunciation transcription technology can generate a text "아침빱" exactly as it is pronounced in the speech.

The pronunciation transcription technology can be used for the purpose of evaluating foreign language pronunciation in the field of foreign language education, etc., but there is almost no academic research related thereto.

Korean Patent Registration No. 10-2323640 (2021.11.03) discloses an apparatus, a method, and a computer-readable medium for providing a speech recognition service.

SUMMARY OF THE INVENTION

The present disclosure has been made in an effort to provide a pronunciation transcription method which can reduce complexity of learning by keeping an input/output unit constant, and enhance pronunciation transcription accuracy.

Meanwhile, a technical object to be achieved by the present disclosure is not limited to the above-mentioned technical object, and various technical objects can be included within the scope which is apparent to those skilled in the art from contents to be described below.

An exemplary embodiment of the present disclosure provides a method performed by a computing device. The method may include: acquiring a partial audio signal of a first sound unit generated by splitting an audio signal; inputting the partial audio signal of the first sound unit into a pronunciation transcription model; and outputting a pronunciation transcription result for the partial audio signal of the first sound unit by using the pronunciation transcription model.

In an exemplary embodiment, the outputting of the pronunciation transcription result for the partial audio signal of the first sound unit may include outputting the pronunciation transcription result by a first character unit corresponding to the first sound unit.

In an exemplary embodiment, the first sound unit may be a syllable unit, the first character unit may be a character unit, the partial audio signal of the first sound unit may include an audio chunk of the syllable unit, and the pronunciation transcription result of the first character unit may include text information of the character unit.

In an exemplary embodiment, the outputting of the pronunciation transcription result by the first character unit corresponding to the first sound unit may include performing pronunciation prediction by a second character unit smaller than the first character unit with respect to the partial audio signal of the first sound unit, and outputting the pronunciation transcription result by the first character unit based on the pronunciation prediction by the second character unit.

In an exemplary embodiment, the first sound unit may be the syllable unit, the first character unit may be the character unit, and the second character unit may be a grapheme unit.

In an exemplary embodiment, the outputting of the pronunciation transcription result by the first character unit based on the pronunciation prediction by the second character unit may include assigning a weight in relation to prediction for a subsequent middle or final consonant based on prediction for an initial or middle consonant of the grapheme unit, performing the prediction for the middle or final consonant based on the assigned weight, and outputting the pronunciation transcription result of the character unit by combining the predictions of the grapheme unit.

In an exemplary embodiment, the audio signal may be split based on an audio signal split model, and the audio signal split model may perform an operation of performing speech-to-text (STT) for the audio signal, an operation of generating the partial audio signal of the first sound unit by splitting the audio signal based on the STT performing result, and an additional operation of generating reference information for the partial audio signal of the first sound unit.

In an exemplary embodiment, the outputting of the pronunciation transcription result for the partial audio signal of the first sound unit may include outputting the pronunciation transcription result for the partial audio signal of the first sound unit by additionally using the reference information generated by the audio signal split model.

In an exemplary embodiment, the reference information may include speech-to-text (STT) information corresponding to the partial audio signal of the first sound unit, and the audio signal split model may correspond to an STT model.

In an exemplary embodiment, an output of the audio signal split model may include timestamp information associated with the partial audio signal of the first sound unit, and STT result text information corresponding to the partial audio signal of the first sound unit.

Another exemplary embodiment of the present disclosure provides a method for training a pronunciation transcription model, which is performed by a computing device. The method may include: acquiring an audio signal split model generating a partial audio signal of a first sound unit by splitting an audio signal; performing transfer learning for the audio signal split model by using learning data for pronunciation transcription; and acquiring the pronunciation transcription model based on the transfer learning, and the pronunciation transcription model may be a model that receives the partial audio signal of the first sound unit from the audio signal split model, and performs prediction related to the pronunciation transcription.

In an exemplary embodiment, the audio signal split model may output the partial audio signal of the first sound unit, and STT information corresponding to the partial audio signal of the first sound unit, and the pronunciation transcription model may output the pronunciation transcription result for the partial audio signal of the first sound unit by using the partial audio signal of the first sound unit, and the STT information.

Still another exemplary embodiment of the present disclosure provides a structure of a neural network model for pronunciation transcription. The structure of the neural network model may include: an audio signal split model generating a partial audio signal of a first sound unit by splitting an audio signal; and a pronunciation transcription model receiving the partial audio signal of the first sound unit from the audio signal split model and performing prediction related to the pronunciation transcription.

In an exemplary embodiment, the audio signal split model may include a speech-to-text (STT) model for generating a partial audio signal of a syllable unit, and the pronunciation transcription model may receive the partial audio signal of the syllable unit, and perform prediction by a character unit related to the pronunciation transcription.

In an exemplary embodiment, the STT model may output the partial audio signal of the syllable unit, and STT information corresponding to the partial audio signal of the syllable unit, and the pronunciation transcription model may output the prediction by the character unit corresponding to the partial audio signal of the syllable unit by using the partial audio signal of the syllable unit and the STT information.

In an exemplary embodiment, the pronunciation transcription model may be acquired by tuning the STT model by using learning data for the pronunciation transcription.

Yet another exemplary embodiment of the present disclosure provides a computer program stored in a computer-readable storage medium. When the computer program is executed by one or more processors, the computer program allows the one or more processors to perform the following operations for pronunciation transcription, and the operations may include: an operation of acquiring a partial audio signal of a first sound unit generated by splitting an audio signal; an operation of inputting the partial audio signal of the first sound unit into a pronunciation transcription model; and an operation of outputting a pronunciation transcription result for the partial audio signal of the first sound unit by using the pronunciation transcription model.

Still yet another exemplary embodiment of the present disclosure provides a computing device. The device may include: at least one processor; and a memory, and at least one processor may be configured to acquire a partial audio signal of a first sound unit generated by splitting an audio signal; input the partial audio signal of the first sound unit into a pronunciation transcription model; and output a pronunciation transcription result for the partial audio signal of the first sound unit by using the pronunciation transcription model.

The present disclosure has been made in an effort to provide a pronunciation transcription method which can reduce complexity of training by keeping an input/output unit constant, and enhance pronunciation transcription accuracy.

For example, according to the present disclosure, an audio chunk divided into a first sound unit (e.g., a syllable unit) is input into a pronunciation transcription model, and a text corresponding to a pronunciation is output by a first letter unit (for example, a character unit) corresponding to the first sound unit (for example, the syllable unit) to reduce complexity of training, and accuracy of pronunciation transcription can be enhanced even though learning is performed with less data.

Meanwhile, the effects of the present disclosure are not limited to the above-mentioned effects, and various effects can be included within the scope which is apparent to those skilled in the art from contents to be described below.

BRIEF DESCRIPTION OF THE DRAWINGS

FIG. 9 is a simple and normal schematic view of an exemplary computing environment in which exemplary embodiments of the present disclosure may be implemented.

DETAILED DESCRIPTION

Figure 1:
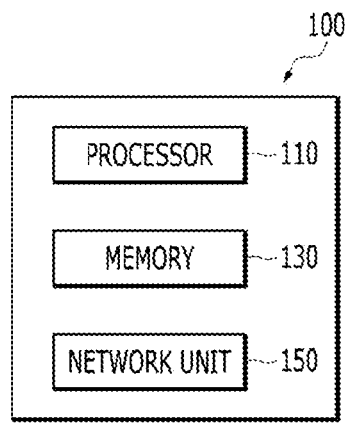
FIG. 1 is a block diagram of a computing device according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers.

Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for transcribing a pronunciation according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing configuration of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 150 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

The network unit 150 according to an exemplary embodiment of the present disclosure may use an arbitrary type known wired/wireless communication systems.

Figure 2:
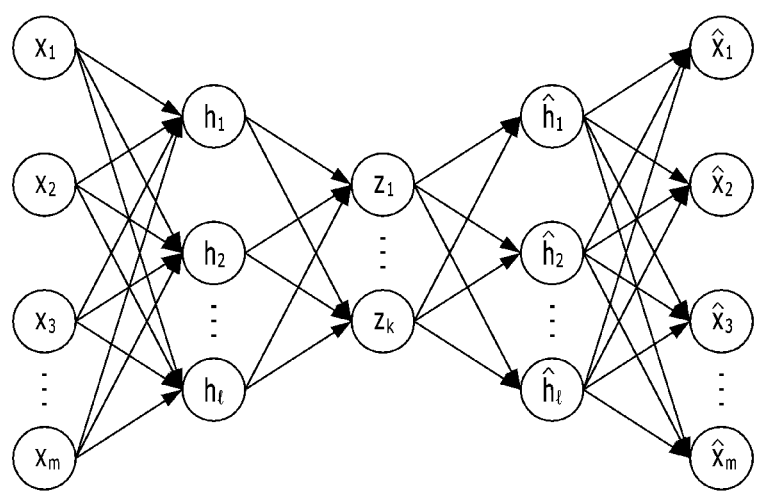
FIG. 2 is a schematic view illustrating a network function according to an exemplary embodiment of the present disclosure.

FIG. 2 is a schematic diagram illustrating a network function according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting training data into the neural network and calculating the output of the neural network for the training data and the error of a target and back-propagating the errors of the neural network from the output layer of the neural network toward the input layer in a direction to reduce the errors to update the weight of each node of the neural network. In the case of the supervised learning, the training data labeled with a correct answer is used for each training data (i.e., the labeled training data) and in the case of the unsupervised learning, the correct answer may not be labeled in each training data. That is, for example, the training data in the case of the supervised learning related to the data classification may be data in which category is labeled in each training data. The labeled training data is input to the neural network, and the error may be calculated by comparing the output (category) of the neural network with the label of the training data. As another example, in the case of the unsupervised learning related to the data classification, the training data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the training data may be generally a subset of actual data (i.e., data to be processed using the learned neural network), and as a result, there may be a learning cycle in which errors for the training data decrease, but the errors for the actual data increase. Overfitting is a phenomenon in which the errors for the actual data increase due to excessive learning of the training data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the training data, regularization, dropout of omitting a part of the node of the network in the process of learning, utilization of a batch normalization layer, etc., may be applied.

Speech recognition (STT or ASR; Speech To Text, or Automatic Speech Recognition), described below, is a dictation technology that converts speech into text. In other words, speech recognition (STT) is a technology that generates text corresponding to the speech (according to spelling). An input of this speech recognition (STT) may include at least one of a speech signal, a spectrogram converted from the speech signal, or a speech feature. Additionally, an output of the speech recognition (STT) is text in the form of a string. Meanwhile, the speech recognition (STT) model may be implemented in various types of models, including a neural network model. Further, the speech recognition (STT) models may be divided into a modularized scheme and a non-modularized end-to-end (e2e) scheme depending on an implemented scheme. Here, the modularized scheme may include an acoustic model (a model that indicates what form the speech signal may be expressed in), a language model (a model that assigns a generation probability in words based on given sentences and words), and a traditional model that perform speech recognition separately by a pronunciation lexicon (for example, some models of Kaldi toolkit-based ASR models, Hybrid-ASR models, etc.), but is not limited thereto. On the contrary, the non-modularized scheme mainly refer to e2e models (e.g., transformer-based encoder decoder models, etc.), and models may be generated by training a lot of data without providing sub-modules. Meanwhile, a beam search technique is a representative decoding technique, and the beam search technique is a method that does not predict only one word that is closest to a ground truth depending on a situation, but finds a most optimal ground truth by considering an entire sentence by opening up various possibilities.

The present disclosure relates to a method for transcribing a human spoken speech into text. More specifically, the present disclosure may propose a new architecture of a pronunciation transcription model for more accurately transcribing an exact pronunciation of the speech. For example, in the present disclosure, ① an audio is split into the first sound unit (for example, the syllable unit), and ② chunk-wise pronunciation transcription of the split first sound unit (for example the syllable unit) is performed to more accurately perform the pronunciation transcription.

According to an exemplary embodiment of the present disclosure, the computing device 100 may include an input module 200, an audio signal split model 300, and a pronunciation transcription model 400. Meanwhile, plural models that may be included in the computing device 100 may include a neural network structure and may be controlled by the processor 110 or implemented by an operation of the processor 110. Additionally, modules and models that may be included in the computing device 100 in relation to pronunciation transcription are not limited to the plural modules and models described above, and additional modules and models may be included. Hereinafter, exemplary plural models for splitting (dividing) an audio signal into specific units and outputting a pronunciation transcription result for the specific unit will be described in more detail.

Meanwhile, hereinafter, the present disclosure will be described focusing on an exemplary embodiment in which the audio signal is split into syllable units and a character-wise pronunciation transcription result is output. However, the present disclosure is not limited to the exemplary embodiment, and various exemplary embodiments may exist. For example, the present disclosure may include various exemplary embodiments including an exemplary embodiment in which the audio signal is split into other sound units (for example, sound units such as a word, a sub-word, a syllable, a phoneme, a consonant, a vowel, etc.), and pronunciation transcription results of different letter units (for example, character units such as a word, a sub-word, a character, a grapheme, a consonant, a vowel, etc.) corresponding to the different sound units are output, etc.

Figure 3:
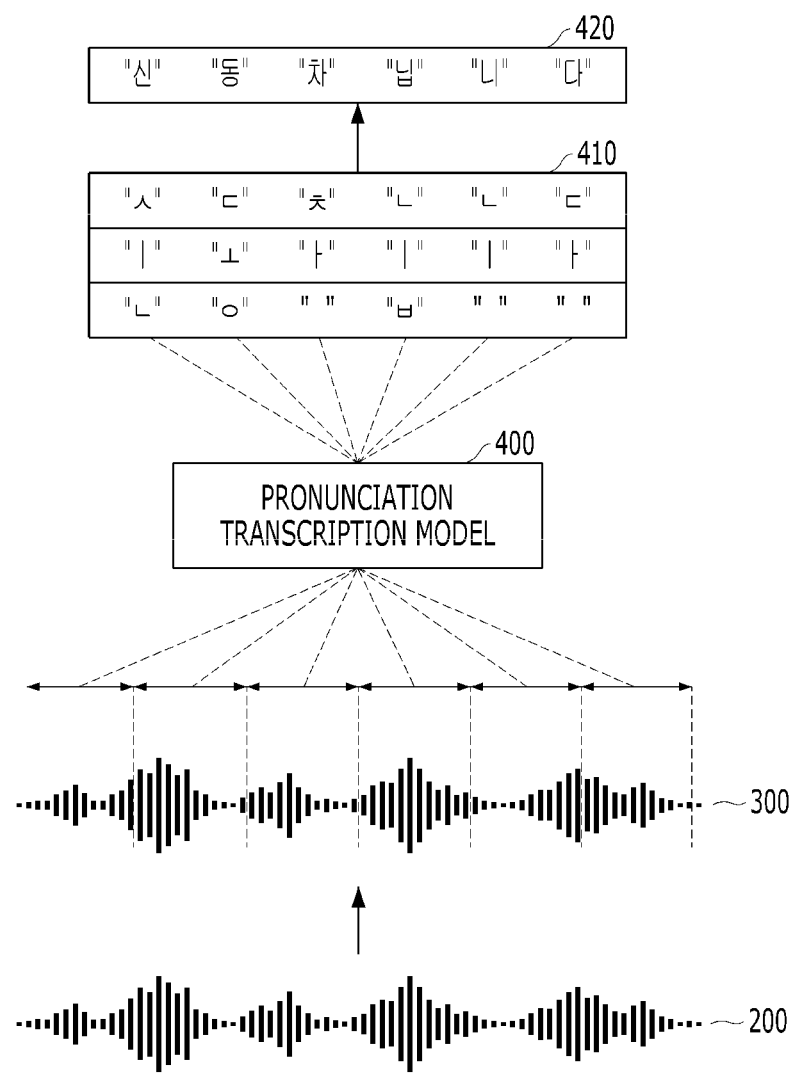
FIG. 3 is a diagram schematically illustrating an operation of outputting a pronunciation transcription result using a pronunciation transcription model according to an exemplary embodiment of the present disclosure.

FIG. 3 is a diagram schematically illustrating an operation of outputting a pronunciation transcription result using a pronunciation transcription model 400 according to an exemplary embodiment of the present disclosure.

According to an exemplary embodiment of the present disclosure, the input module 200 may receive an audio signal. Here, the audio signal may include a human spoken speech. Further, the audio signal may also include at least any one of a speech signal, a spectrogram converted from the speech signal, or a speech feature. As an example, the input module 200 may receive an audio signal corresponding to speaking of "신동찬입니다".

According to an exemplary embodiment of the present disclosure, the audio signal split model 300 may perform preprocessing such as noise removal, speech enhancement, voice activity detection (VAD), etc., with respect to an audio input from the input module 200 before splitting the audio signal. Meanwhile, such a preprocessing process may also be performed with respect to the output of the audio signal split model 300 other than the input of the audio signal split model 300.

According to an exemplary embodiment of the present disclosure, the audio signal split model 300 splits the audio signal to generate a partial audio signal of a first sound unit. As an example, the first sound unit may include the sub-word, the syllable, the phoneme, and the consonant and the vowel. Further, the partial audio signal of the first sound unit (e.g., syllable unit) may include an audio chunk of a specific sound unit. In other words, when the first sound unit is the syllable unit, the partial audio signal of the first sound unit may include an audio chunk of the syllable unit. This audio signal split model 300 may play a role in assisting pronunciation transcription to be performed by audio chunk corresponding to a predetermined sound unit.

In addition, the audio signal split model 300 may output timestamp information associated with the partial audio signal of the first sound unit (e.g., syllable unit). For example, referring to FIG. 3, the audio signal split model 300 uses at least one of feature extraction or audio-character splitter to divide and output timestamp information of the partial audio signal for the first sound unit (e.g., syllable unit). For example, the audio signal split model 300 divides the timestamp information into (i) 0 to 1 second: a speech of speaking "신", (ii) 1 to 2 seconds: a speech of speaking "동", (iii) 2 to 3 seconds: a speech of speaking "찬", (iv) 3 to 4 seconds: a speech of speaking "입", (v) 4 to 5 seconds: a speech of speaking "니", and (vi) 5 to 6 seconds: a speech of speaking "다" to generate the partial audio signal.

For reference, as the partial audio signal of the first sound unit (e.g., syllable unit) is generated by the audio signal split model 300, the length of audio input into the pronunciation transcription model 400 becomes much less variable (for example, a length of the input audio is constant as a length of an audio feature corresponds to one syllable), and a performing speed of pronunciation transcription learning may be rapidly increased. In addition, when the input/output unit of the pronunciation transcription model 400 is configured to be constant (e.g., the input is an audio chunk divided into the first sound unit (e.g., syllable unit), and the output is a text of a first letter unit (e.g., character unit) corresponding to the first sound unit (e.g., syllable unit), multiple complexities are reduced to enhance accuracy at the time of performing the pronunciation transcription. Further, when a finally output unit is fixed to a constant character unit (for example, when the input is the syllable, the output unit is fixed to one character), there is no need to use an approximate loss such as connectionist temporal classification (CTC), and model training is possible only by CE loss, so the pronunciation transcription model may be more accurately trained.

According to an exemplary embodiment of the present disclosure, the pronunciation transcription model 400 may receive the partial audio signal of the first sound unit (e.g., syllable) from the audio signal split model 300. For example, the pronunciation transcription model 400 may receive a partial audio signal including (i) 0 to 1 second: a speech of speaking "신", (ii) 1 to 2 seconds: a speech of speaking "동", (iii) 2 to 3 seconds: a speech of speaking "찬", (iv) 3 to 4 seconds: a speech of speaking "입", (v) 4 to 5 seconds: a speech of speaking "니", and (vi) 5 to 6 seconds: a speech of speaking "다" in order according to a timestamp result output by the audio signal split model 300.

According to an exemplary embodiment, the pronunciation transcription model 400 may ① "output the pronunciation transcription result by the first letter unit corresponding to the first sound unit" or ② "perform pronunciation prediction by a second letter unit smaller than the first letter unit with respect to the partial audio signal of the first sound unit, and output the pronunciation transcription result by the first letter unit based on the pronunciation prediction of the second letter unit".

In this case, the pronunciation transcription result of the first letter unit may include text information of a specific unit. According to an exemplary embodiment, when the first letter unit is the character unit, the pronunciation transcription result of the first letter unit may include text information of the character unit. Alternatively, the first letter unit may also include the sub-word, the grapheme, or the consonant and the vowel. For reference, when the sound unit is the sub-word, the letter unit corresponding to the sound unit, the sub-word, when the sound unit is the syllable, the letter unit corresponding to the sound unit is the character, when the sound unit is the phoneme, the corresponding letter unit is the grapheme, and when the sound unit is the constant and the vowel, the letter unit corresponding to the sound unit is the consonant and vowel.

First, the pronunciation transcription model 400 may ① "output the pronunciation transcription result by the first letter unit (e.g. character unit) corresponding to the first sound unit (e.g., syllable unit)". For example, the pronunciation transcription model 400 may output the pronunciation transcription result by 0 to 1 second: a text of speaking "신", 1 to 2 seconds: a text of speaking "동", 2 to 3 seconds: a text of speaking "찬", 3 to 4 seconds: a text of speaking "입", 4 to 5 seconds: a text of speaking "니", and 5 to 6 seconds: a text of speaking "다" in order according to the timestamp result output by the audio signal split model 300.

Further, the pronunciation transcription model 400 may ② "perform the pronunciation prediction by the second letter unit (e.g., grapheme unit) smaller than the first letter unit (e.g. character unit) with respect to the partial audio signal of the first sound unit (e.g., syllable unit)". For example, referring to reference numeral 410 of FIG. 3, the pronunciation transcription model 400 may predict letters of the second letter unit (e.g., grapheme unit), such as "ㅅ", "ㅣ", and "ㄴ" when receiving the partial audio signal (i.e., the speaking speech of "신") corresponding to 0 to 1 second. Further, the pronunciation transcription model 400 may predict letters of the second letter unit (e.g., grapheme unit), such as "ㄷ", "ㅗ", and "ㅇ" when receiving the partial audio signal (i.e., the speaking speech of "동") corresponding to 1 to 2 second. Further, the pronunciation transcription model 400 may predict letters of the second letter unit (e.g., grapheme unit), such as "ㅊ", "ㅏ", and "" when receiving the partial audio signal (i.e., the speaking speech of "차") corresponding to 2 to 3 seconds. Further, the pronunciation transcription model 400 may predict letters of the second letter unit (e.g., grapheme unit), such as "ㄴ", "ㅣ", and "ㅂ" when receiving the partial audio signal (i.e., the speaking speech of "닙") corresponding to 3 to 4 seconds. Further, the pronunciation transcription model 400 may predict letters of the second letter unit (e.g., grapheme unit), such as "ㄴ", "ㅣ", and "" when receiving the partial audio signal (i.e., the speaking speech of "니") corresponding to 4 to 5 seconds. Further, the pronunciation transcription model 400 may predict letters of the second letter unit (e.g., grapheme unit), such as "ㄷ", "ㅏ", and "" when receiving the partial audio signal (i.e., the speaking speech of "다") corresponding to 5 to 6 seconds.

The pronunciation transcription model 400 may output the pronunciation transcription result by the first letter unit (e.g. character unit) based on the pronunciation prediction of the second letter unit (e.g., grapheme unit)". In other words, the pronunciation transcription model 400 combines initial, middle, and final consonants (there may be no final consonant depending on the syllable), which is the result of the pronunciation prediction of the second letter unit (e.g., grapheme unit) to output the pronunciation transcription result of the first letter unit (e.g., character unit). For example, the pronunciation transcription model 400 combines grapheme units predicted as "ㅅ", "ㅣ", and "ㄴ" to output the pronunciation transcription result as "신", which is the character unit.

In this case, the pronunciation transcription model 400 may assign a weight in relation to prediction for a subsequent middle or final consonant based on prediction for an initial or middle consonant of the grapheme unit in order to output the pronunciation transcription result by the first letter unit (e.g. character unit) based on the pronunciation prediction of the second letter unit (e.g., grapheme unit)". Further, the pronunciation transcription model 400 may perform the prediction for the middle or final consonant based on the assigned weight. Additionally, the pronunciation transcription model 400 may output the pronunciation transcription result of the character unit by combining predictions by the grapheme unit.

Meanwhile, the pronunciation transcription model 400 utilizes a dependency relationship between the initial consonant, the middle consonant, and the final consonant when predicting in the grapheme unit to reduce the complexity of the problem that the model must predict compared to the case of predicting by the character unit. More specifically, since a final unit to be predicted is determined by the graphemes that make up one character ("initial+middle+final consonant (there may be no final consonant depending on the syllable)"), the complexity of the problem that the model must predict may be reduced.

The pronunciation transcription model 400 performs prediction by the second letter unit (e.g., grapheme unit) smaller than the first letter unit (e.g., character unit) to train data regarding combinations (e.g., double consonant-double vowel-double consonant combinations such as ""똥", "빡" ", etc.) which do not appear frequently on a rule base by using data prepared in advance, and may assign a high weight to a middle or final consonant which is highly likely to appear next by referring to initial or middle consonant information which appears previously, thereby performing customizing for a situation in which a specific consonant-vowel combination frequently appears.

When the prediction is performed by the syllable unit, the number of Korean syllables is 11,172, and as a result, the number of classes to be predicted excessively increases, and the syllables are not included in training data, so a phenomenon (out of vocabulary (OoV)) in which an omitted word is generated upon training may occur, but the prediction is performed by the grapheme unit, and as a result, (the number of Korean graphemes is just 68) the number of classes to be predicted may significantly decrease, and the phenomenon in which the omitted word is generated upon training may not occur. For example, there is a high possibility that ""똥", "빡" ", etc., will not be present in the training data, and when the prediction is performed by the syllable unit, ""똥", "빡" ", etc., are not trained, so it is impossible to predict ""똥", "빡" ", etc., even though speeches such as ""똥", "빡" ", etc., are actually input in an inference step. However, when the prediction is performed by the grapheme unit, the characters themselves such as ""똥", "빡" ", etc., are not predicted, and decomposed into the grapheme unit, and predicted, so a possibility that pronunciations corresponding to ""똥", "빡" ", etc., will be normally output becomes relatively much higher.

According to an exemplary embodiment of the present disclosure, the pronunciation transcription model 400 may finally output the pronunciation transcription result by the first letter unit (e.g. character unit) like ""신" "동" "차" "닙" "니" "다" " based on the pronunciation prediction of the second letter unit (e.g., grapheme unit)" predicted as illustrated in 420 of FIG. 3.

Figure 4:
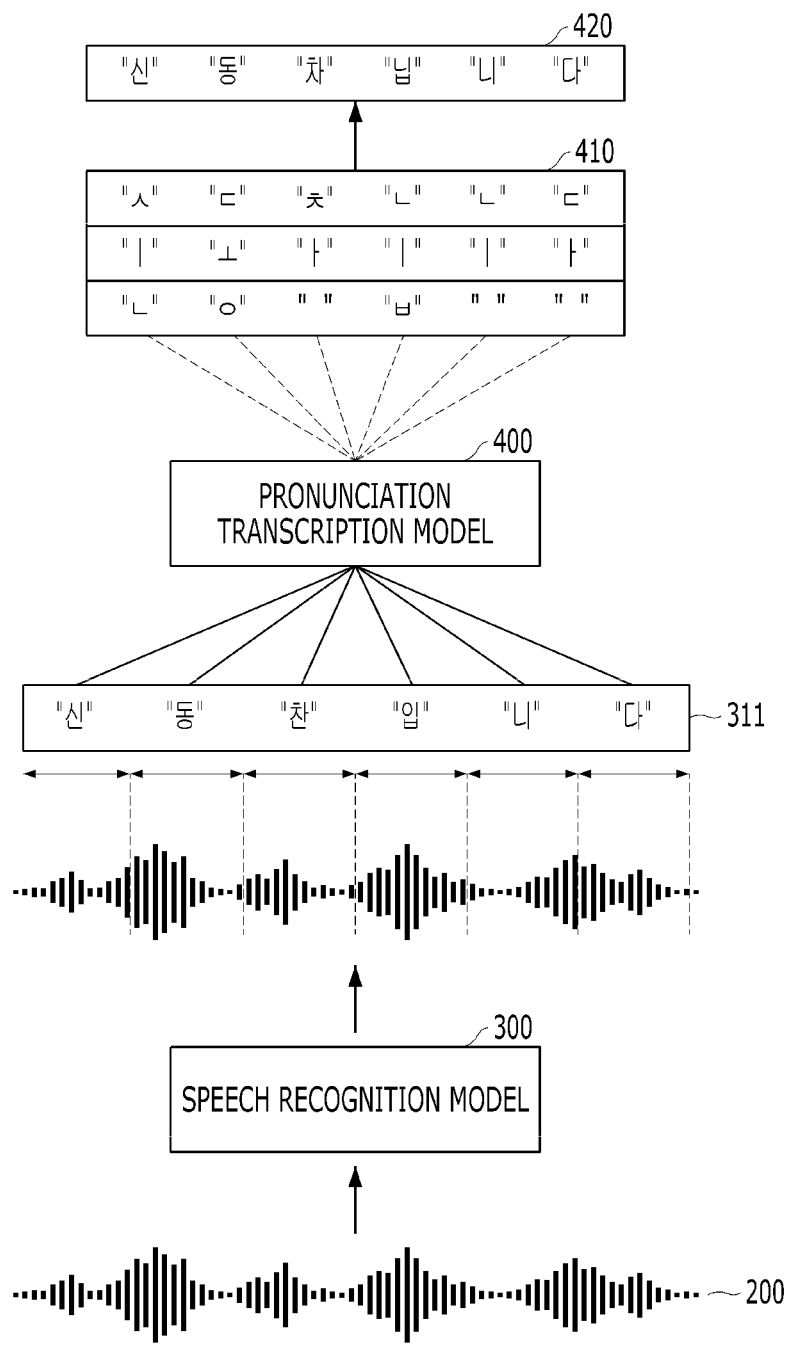
FIG. 4 is a diagram schematically illustrating an operation of outputting a pronunciation transcription result by further considering reference information generated from an audio signal split model according to an exemplary embodiment of the present disclosure.

FIG. 4 is a diagram schematically illustrating an operation of outputting a pronunciation transcription result by further considering reference information generated from an audio signal split model according to an exemplary embodiment of the present disclosure.

According to an exemplary embodiment of the present disclosure, the input module 200 may receive an audio signal. Here, the audio signal may include a human spoken speech. Further, the audio signal may also include at least any one of a speech signal, a spectrogram converted from the speech signal, or a speech feature. For example, the input module 200 may receive an audio signal of ""신동찬입니다". ".

According to an exemplary embodiment of the present disclosure, the audio signal split model 300 may perform preprocessing such as noise removal, speech enhancement, voice activity detection (VAD), etc., with respect to an audio input from the input module 200 before splitting the audio signal. Meanwhile, such a preprocessing process may also be performed with respect to the output of the audio signal split model 300 other than the input of the audio signal split model 300.

According to an exemplary embodiment of the present disclosure, the audio signal split model 300 splits the audio signal to generate a partial audio signal of a first sound unit. Further, the audio signal split model 300 may be implemented based on an STT model. According to an exemplary embodiment, the audio signal split model 300 may split the audio signal by the first sound unit (e.g., syllable unit) by using an end-to-end STT model or a modularized STT. When the end-to-end STT model is used, the audio signal may be split by the first sound unit (e.g., syllable unit) by using an encoder-decoder attention based model or a Continuous Integrate-and-Fire for End-to-End Speech Recognition (CIF) method. When the modularized STT is used, the audio signal may be split by the first sound unit (e.g., syllable unit) by using an acoustic model in Kaldi-asr which is a framework which handles the modularized STT, and a forced alignment algorithm which estimates a timestamp of the first sound unit (e.g., syllable unit) using a pronunciation lexicon. In the forced alignment algorithm, when a speaking speech and a speaking sentence (reference transcript) are given, a triphone based STT model may be performed through a process of acquiring an optimal matching between the speaking sentence and triphone states.

The audio signal split model 300 splits the audio signal to generate the partial audio signal of the first sound unit. As an example, the first sound unit may include the sub-word, the syllable, the phoneme, and the consonant and the vowel. Further, the partial audio signal of the first sound unit (e.g., syllable unit) may include an audio chunk of a specific sound unit. In other words, when the first sound unit is the syllable unit, the partial audio signal of the first sound unit may include an audio chunk of the syllable unit. This audio signal split model 300 may play a role in assisting pronunciation transcription to be performed by audio chunk corresponding to a predetermined sound unit.

The audio signal split model 300 may output timestamp information associated with the partial audio signal of the first sound unit (e.g., syllable unit). For example, referring to FIG. 4, the audio signal split model 300 uses at least one of feature extraction, a speech-to-text (STT) performing result text, or an audio-character splitter to generate the partial audio signal by distinguishing the STT result text of the STT model and the timestamp of the first sound unit (e.g., syllable unit) corresponding to the STT result text. For example, the audio signal split model 300 divides the timestamp into (i) 0 to 1 second: a speaking speech corresponding to "신" which is the STT result, (ii) 1 to 2 seconds: a speaking speech corresponding to "동" which is the STT result, (iii) 2 to 3 seconds: a speaking speech corresponding to "찬" which is the STT result, (iv) 3 to 4 seconds: a speaking speech corresponding to "입" which is the STT result, (v) 4 to 5 seconds: a speaking speech corresponding to "니" which is the STT result, and (vi) 5 to 6 seconds: a speaking speech corresponding to "다" which is the STT result to generate the partial audio signal.

According to an exemplary embodiment of the present disclosure, the audio signal split model 300 may generate reference information 311 for the partial audio signal of the first sound unit (e.g., syllable unit). Here, the audio signal split model 300 may include the STT model as mentioned above, and the reference information 311 may include speech-to-text (STT) information corresponding to the partial audio signal of the first sound unit. That is, the audio signal split model 300 may output "the partial audio signal of the first sound unit (e.g., syllable unit)" and "the STT information corresponding to the partial audio signal of the first sound unit" by using the STT model. For example, the audio signal split model 300 may output "the partial audio signal of syllable unit" and "the STT information corresponding to the partial audio signal of the syllable unit (as the reference information 311)" by using the STT model. As an example, the audio signal split model 300 performs STT for an entire input audio signal by using the STT model, and divides an STT performing result text by the character unit to divide the entire audio signal for each syllable. That is, the audio signal split model 300 may obtain timestamp information for dividing the audio signal for each first sound unit by using the STT model. The audio signal split model 300 may obtain first sound unit-wise STT information (e.g., syllable-wise character information) as the reference information 311 based on the timestamp information.

For example, the audio signal split model 300 performs the STT for the entire audio signal to acquire a text "신동찬입니다", and divides the audio signal for each character of the STT result text to acquire the timestamp information for dividing the audio signal for each syllable (=first sound unit). In other words, the audio signal split model 300 may generate reference information 311 such as (i) reference information of the partial audio signal for 0 to 1 second: text information "신" which is an STT result corresponding to the partial audio signal, (ii) reference information of the partial audio signal for 1 to 2 seconds: text information "동" which is an STT result corresponding to the partial audio signal, (iii) reference information of the partial audio signal for 2 to 3 seconds: text information "찬" which is an STT result corresponding to the partial audio signal, (iv) reference information of the partial audio signal for 3 to 4 seconds: text information "입" which is an STT result corresponding to the partial audio signal, (v) reference information of the partial audio signal for 4 to 5 seconds: text information "니" which is an STT result corresponding to the partial audio signal, and (iv) reference information of the partial audio signal for 5 to 6 seconds: text information "다" which is an STT result corresponding to the partial audio signal.

For reference, as the partial audio signal of the first sound unit (e.g., syllable unit) is generated by the audio signal split model 300, the length of audio input into the pronunciation transcription model 400 becomes much less variable (for example, a length of the input audio is constant as a length of an audio feature corresponds to one syllable), and a performing speed of pronunciation transcription training may be rapidly increased. In addition, when the input/output unit of the pronunciation transcription model 400 is configured to be constant (e.g., the input is an audio chunk divided into the first sound unit (e.g., syllable unit), and the output is a text of a first letter unit (e.g., character unit) corresponding to the first sound unit (e.g., syllable unit), multiple complexities are reduced to enhance accuracy at the time of performing the pronunciation transcription. Further, when a finally output unit is fixed to a constant letter unit (for example, when the input is the syllable, the output unit is fixed to one character), there is no need to use an approximate loss such as connectionist temporal classification (CTC), and model training is possible only by CE loss, so the pronunciation transcription model may be more accurately trained. Additionally, the reference information 311 generated by the audio signal split model 300 is delivered to the pronunciation transcription model 400 jointly with the partial audio signals, and in the prediction process of the pronunciation transcription model 400, the reference information 311 may be used as auxiliary information, and through this, the accuracy of pronunciation transcription prediction may be further improved.

According to an exemplary embodiment of the present disclosure, the pronunciation transcription model 400 may receive "the partial audio signal of the first sound unit (e.g., syllable)" and "the STT information (reference information) corresponding to the partial audio signal of the first sound unit" from the audio signal split model 300. For example, the pronunciation transcription model 400 may divide and receive the partial audio signal into (i) 0 to 1 second: the speaking speech corresponding to "신" which is the STT result, (ii) 1 to 2 seconds: the speaking speech corresponding to "동" which is the STT result, (iii) 2 to 3 seconds: the speaking speech corresponding to "찬" which is the STT result, (iv) 3 to 4 seconds: the speaking speech corresponding to "입" which is the STT result, (v) 4 to 5 seconds: the speaking speech corresponding to "니" which is the STT result, and (vi) 5 to 6 seconds: the speaking speech corresponding to "다" which is the STT result, which are generated by the audio signal split model 300. Further, the pronunciation transcription model 400 may receive the reference information 311 such as (i) the reference information of the partial audio signal for 0 to 1 second: the text information "신" which is the STT result corresponding to the partial audio signal, (ii) the reference information of the partial audio signal for 1 to 2 seconds: the text information "동" which is the STT result corresponding to the partial audio signal, (iii) the reference information of the partial audio signal for 2 to 3 seconds: the text information "찬" which is the STT result corresponding to the partial audio signal, (iv) the reference information of the partial audio signal for 3 to 4 seconds: the text information "입" which is the STT result corresponding to the partial audio signal, (v) the reference information of the partial audio signal for 4 to 5 seconds: the text information "니" which is the STT result corresponding to the partial audio signal, and (iv) the reference information of the partial audio signal for 5 to 6 seconds: the text information "다" which is the STT result corresponding to the partial audio signal.

According to an exemplary embodiment, the pronunciation transcription model 400 additionally uses the STT information (i.e., reference information) generated by the audio signal split model to ① "output the pronunciation transcription result by the first letter unit corresponding to the first sound unit" or ② "perform pronunciation prediction by a second letter unit smaller than the first letter unit with respect to the partial audio signal of the first sound unit, and output the pronunciation transcription result by the first letter unit based on the pronunciation prediction of the second letter unit".

In this case, the pronunciation transcription result of the first letter unit may include text information of a specific letter unit. According to an exemplary embodiment, when the first letter unit is the character unit, the pronunciation transcription result of the first letter unit may include text information of the character unit. Alternatively, the first letter unit may also include the sub-word, the grapheme, or the consonant and the vowel. For reference, when the sound unit is the sub-word, the letter unit corresponding to the sound unit, the sub-word, when the sound unit is the syllable, the letter unit corresponding to the sound unit is the character, when the sound unit is the phoneme, the corresponding letter unit is the grapheme, and when the sound unit is the constant and the vowel, the letter unit corresponding to the sound unit is the consonant and vowel.

First, the pronunciation transcription model 400 additionally uses the STT information (reference information) generated by the audio signal split model to ① "output the pronunciation transcription result by the first letter unit (e.g. character unit) corresponding to the first sound unit (e.g., syllable unit)". For example, the pronunciation transcription model 400 may output pronunciation transcription results in order according to the timestamp result output based on the STT performing result text "신동찬입니다" in the audio signal split model 300. Further, the pronunciation transcription model 400 may output "신" which is the pronunciation transcription result of the character unit by using (i) 0 to 1 second: the speaking speech (i.e., partial audio signal of the syllable unit) corresponding to "신" which is the STT result and reference information (i.e., text information "신" which is the STT result). Specifically, the pronunciation transcription model 400 may output "동" which is the pronunciation transcription result of the character unit by using (ii) 1 to 2 seconds: the speaking speech (i.e., partial audio signal of the syllable unit) corresponding to "동" which is the STT result and reference information (i.e., text information "동" which is the STT result). Further, the pronunciation transcription model 400 may output "찬" which is the pronunciation transcription result of the character unit by using (iii) 2 to 3 seconds: the speaking speech (i.e., partial audio signal of the syllable unit) corresponding to "찬" which is the STT result and reference information (i.e., text information "찬" which is the STT result). Further, the pronunciation transcription model 400 may output "닙" which is the pronunciation transcription result of the character unit by using (iv) 3 to 4 seconds: the speaking speech (i.e., partial audio signal of the syllable unit) corresponding to "입" which is the STT result and reference information (i.e., text information "입" which is the STT result). Further, the pronunciation transcription model 400 may output "니" which is the pronunciation transcription result of the character unit by using (v) 4 to 5 seconds: the speaking speech (i.e., partial audio signal of the syllable unit) corresponding to "니" which is the STT result and reference information (i.e., text information "니" which is the STT result). Further, the pronunciation transcription model 400 may output "다" which is the pronunciation transcription result of the character unit by using (vi) 5 to 6 seconds: the speaking speech (i.e., partial audio signal of the syllable unit) corresponding to "다" which is the STT result and reference information (i.e., text information "다" which is the STT result).

For reference, the reference information (e.g., the STT result of the character unit) generated by the STT model of the audio signal split model 300 and the pronunciation transcription result (e.g., the pronunciation transcription result of the character unit) generated by the pronunciation transcription model 400 are almost similar to each other, which will assist the prediction of the pronunciation transcription based on the reference information 311. For example, the reference information 311 may prevent a character not related from being predicted in the pronunciation transcription model 400, or assists a text to be output by the pronunciation transcription model 400 to improve the accuracy of the pronunciation transcription. More specifically, when '입' of "신동찬입니다" is taken as an example, at the time of splitting the first sound unit (e.g., syllable unit), '입' which is a text corresponding to the speech (according to spelling) will be output from the STT model of the audio signal split model 400, and the pronunciation transcription model 400 will predict "닙" as it is pronounced. Here, when the pronunciation transcription model 400 predicts the character '닙', '입' which is the STT result information may be used as a hint, and through this, the accuracy of the pronunciation transcription may be further improved.

The pronunciation transcription model 400 additionally uses the STT information (reference information) generated by the audio signal split model to ② perform the pronunciation prediction by the second letter unit (e.g. grapheme unit) smaller than the first letter unit (e.g., character unit) with respect to the partial audio signal of the first sound unit (e.g., syllable unit). For example, referring to reference numeral 410 of FIG. 4, the pronunciation transcription model 400 may predict letters of the second letter unit (e.g., grapheme unit), such as "ㅅ", "ㅣ", and "ㄴ" when receiving the partial audio signal (i.e., 0 to 1 second: the speaking speech corresponding to "신" which is the STT result) corresponding to 0 to 1 second and the reference information (i.e., the text information "신" which is the STT result) based on "신동찬입니다" which is the STT performing result text. Further, the pronunciation transcription model 400 may predict characters of the second character unit (e.g., grapheme unit), such as "ㄷ", "ㅗ", and "ㅇ" when receiving the partial audio signal (i.e., 1 to 2 second: the speaking speech corresponding to "동" which is the STT result) corresponding to 1 to 2 seconds and the reference information (i.e., the text information "동" which is the STT result). Further, the pronunciation transcription model 400 may predict characters of the second character unit (e.g., grapheme unit), such as "ㅊ", "ㅏ", and " " when receiving the partial audio signal (i.e., 2 to 3 seconds: the speaking speech corresponding to "찬" which is the STT result) corresponding to 2 to 3 seconds and the reference information (i.e., the text information "찬" which is the STT result). Further, the pronunciation transcription model 400 may predict characters of the second character unit (e.g., grapheme unit), such as "ㄴ", "ㅣ", and "ㅂ" when receiving the partial audio signal (i.e., 3 to 4 seconds: the speaking speech corresponding to "입" which is the STT result) corresponding to 3 to 4 seconds and the reference information (i.e., the text information "입" which is the STT result). Further, the pronunciation transcription model 400 may predict characters of the second character unit (e.g., grapheme unit), such as "ㄴ", "ㅣ", and " " when receiving the partial audio signal (i.e., 4 to 5 seconds: the speaking speech corresponding to "니" which is the STT result) corresponding to 4 to 5 seconds and the reference information (i.e., the text information "니" which is the STT result). Further, the pronunciation transcription model 400 may predict characters of the second character unit (e.g., grapheme unit), such as "ㄷ", "ㅏ", and " " when receiving the partial audio signal (i.e., 5 to 6 seconds: the speaking speech corresponding to "다" which is the STT result) corresponding to 5 to 6 seconds and the reference information (i.e., the text information "다" which is the STT result).

The pronunciation transcription model 400 may output the pronunciation transcription result by the first letter unit (e.g. character unit) based on the pronunciation prediction of the second letter unit (e.g., grapheme unit)". In other words, the pronunciation transcription model 400 combines initial, middle, and final consonants (there may be no final consonant depending on the syllable), which is the result of the pronunciation prediction of the second letter unit (e.g., grapheme unit) to output the pronunciation transcription result of the first letter unit (e.g., character unit). For example, the pronunciation transcription model 400 combines grapheme units predicted as "ㅅ", "ㅣ", and "ㄴ" to output the pronunciation transcription result as "신", which is the character unit.

In this case, the pronunciation transcription model 400 may assign a weight in relation to prediction for a subsequent middle or final consonant based on prediction for an initial or middle consonant of the grapheme unit in order to output the pronunciation transcription result by the first letter unit (e.g. character unit) based on the pronunciation prediction of the second letter unit (e.g., grapheme unit)". Further, the pronunciation transcription model 400 may perform the prediction for the middle or final consonant based on the assigned weight. Additionally, the pronunciation transcription model 400 may output the pronunciation transcription result of the character unit by combining predictions by the grapheme unit.

Meanwhile, the pronunciation transcription model 400 utilizes a dependency relationship between the initial consonant, the middle consonant, and the final consonant when predicting in the grapheme unit to reduce the complexity of the problem that the model must predict compared to the case of predicting by the character unit. More specifically, since a final unit to be predicted is determined by the graphemes that make up one character ("initial+middle+final consonant (there may be no final consonant depending on the syllable)"), the complexity of the problem that the model must predict may be reduced.

The pronunciation transcription model 400 performs prediction by the second letter unit (e.g., grapheme unit) smaller than the first letter unit (e.g., character unit) to train data regarding combinations (e.g., double consonant-double vowel-double consonant combinations such as "뚊", "빩", etc.) which do not appear frequently on a rule base by using data prepared in advance, and may assign a high weight to a middle or final consonant which is highly likely to appear next by referring to initial or middle consonant information which appears previously, thereby performing customizing for a situation in which a specific consonant-vowel combination frequently appears.

When the prediction is performed by the syllable unit, the number of Korean syllables is 11,172, and as a result, the number of classes to be predicted excessively increases, and the syllables are not included in training data, so a phenomenon (out of vocabulary (OoV)) in which an omitted word is generated upon training may occur, but the prediction is performed by the grapheme unit, and as a result, (the number of Korean grapheme is just 68) the number of classes to be predicted may significantly decrease, and the phenomenon in which the omitted word is generated upon training may not occur. For example, there is a high possibility that "뚊", "빩", etc., will not be present in the training data, and when the prediction is performed by the syllable unit, "뚊", "빩", etc., are not trained, so it is impossible to predict "뚊", "빩", etc., even though speeches such as "뚊", "빩", etc., are actually input in an inference step. However, when the prediction is performed by the grapheme unit, the characters themselves such as "뚊", "빩", etc., are not predicted, and decomposed into the grapheme units, and predicted, so a possibility that pronunciations corresponding to "뚊", "빩", etc., will be normally output becomes relatively much higher.

According to an exemplary embodiment of the present disclosure, the pronunciation transcription model 400 may finally output the pronunciation transcription result by the first letter unit (e.g. character unit) like "신" "동" "차" "님" "니" "다" based on the pronunciation prediction of the second letter unit (e.g., grapheme unit)" predicted as illustrated in 420 of FIG. 4.

Figure 5:
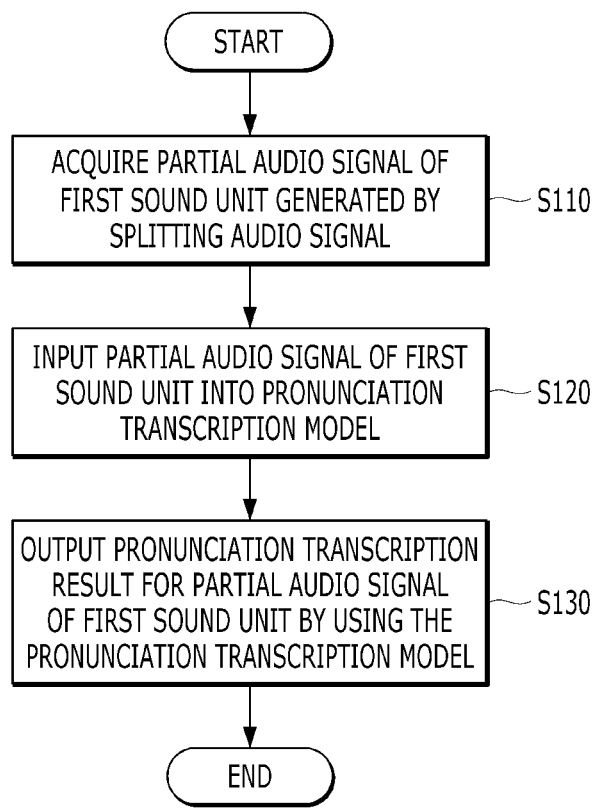
FIG. 5 is a flowchart for a pronunciation transcription method according to an exemplary embodiment of the present disclosure.

FIG. 5 is a flowchart for a pronunciation transcription method according to an exemplary embodiment of the present disclosure.

The pronunciation transcription method illustrated in FIG. 5 may be performed by the computing device 100. Hereinafter, even though not mentioned in detail, the contents regarding the computing device 100 may also be similarly applied to a description of a method for generating the speech.

Referring to FIG. 5, the pronunciation transcription method according to an exemplary embodiment of the present disclosure may include a step S110 of acquiring a partial audio signal of a first sound unit generated by splitting an audio signal, a step S120 of inputting the partial audio signal of the first sound unit into a pronunciation transcription model, and a step S130 of outputting a pronunciation transcription result for the partial audio signal of the first sound unit by using the pronunciation transcription model. Further, the pronunciation transcription method according to an exemplary embodiment of the present disclosure may be performed by the computing device 100.

Step S110 above is a step of acquiring the partial audio signal of the first sound unit generated by splitting an audio signal. Here, the audio signal may be split based on an audio signal split model, and the audio signal split model may perform an operation of splitting the audio signal to generate the partial audio signal of the first sound unit, and an additional operation of generating reference information for the partial audio signal of the first sound unit. Further, the step of outputting the pronunciation transcription result for the partial audio signal of the first sound unit may include a step of outputting the pronunciation transcription result for the partial audio signal of the first sound unit by additionally using the reference information generated by the audio signal split model. Here, the reference information may include speech-to-text (STT) information corresponding to the partial audio signal of the first sound unit, and the audio signal split model may correspond to an STT model.

Step S120 above is a step of inputting the partial audio signal of the first sound unit into a pronunciation transcription model. Step S120 above may include a step of outputting the pronunciation transcription result by a first letter unit corresponding to the first sound unit. Here, the first sound unit may be a syllable unit, the first letter unit may be a character unit, the partial audio signal of the first sound unit may include an audio chunk of the syllable unit, and the pronunciation transcription result of the first letter unit may include text information of the character unit.

Step S130 above is a step of outputting the pronunciation transcription result for the partial audio signal of the first sound unit by using the pronunciation transcription model. Step S130 above may include a step of performing pronunciation prediction by a second letter unit smaller than the first letter unit with respect to the partial audio signal of the first sound unit, and a step of outputting the pronunciation transcription result by the first letter unit based on the pronunciation prediction of the second letter unit. Here, the first sound unit may be the syllable unit, the first letter unit may be the character unit, and the second letter unit may be the grapheme unit.

The steps mentioned in the above description may be further split into additional steps, or combined into less steps according to an implementation example of the present disclosure. Further, some steps may also be omitted as necessary, and an order between the steps may be changed.

Figure 6:
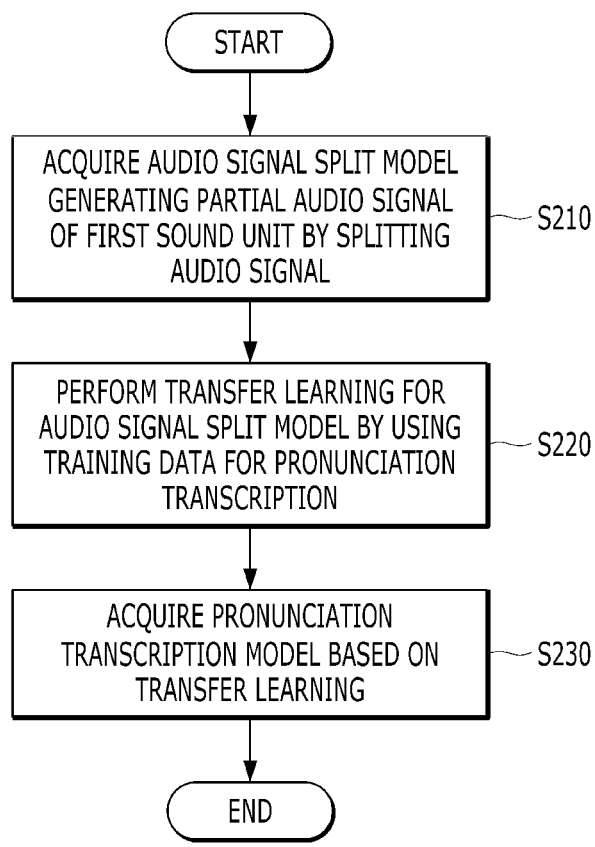
FIG. 6 is a flowchart for a method for training a pronunciation transcription model according to an exemplary embodiment of the present disclosure.

FIG. 6 is a flowchart for a method for training a pronunciation transcription model according to an exemplary embodiment of the present disclosure.

Referring to FIG. 6, the method for training the pronunciation transcription model may include a step S210 of acquiring the audio signal split model generating the partial audio signal of the first sound unit by splitting an audio signal, a step S220 of performing transfer learning for the audio signal split model by using training data for pronunciation transcription, and a step S230 of acquiring the pronunciation transcription model based on the transfer learning. Further, the method for training the pronunciation transcription model according to an exemplary embodiment of the present disclosure may be performed by the computing device 100.

Step S210 above is a step of acquiring the audio signal split model generating the partial audio signal of the first sound unit by splitting the audio signal. Here, the audio signal split model may output the partial audio signal of the first sound unit, and STT information corresponding to the partial audio signal of the first sound unit, and the pronunciation transcription model may output the pronunciation transcription result for the partial audio signal of the first sound unit by using the partial audio signal of the first sound unit, and the STT information. Meanwhile, the audio signal split model may include a speech-to-text (STT) model for generating a partial audio signal of a syllable unit. In this case, the STT model may output the partial audio signal of the syllable unit, and STT information corresponding to the partial audio signal of the syllable unit.

Step S220 above is a step of performing transfer learning for the audio signal split model by using training data for pronunciation transcription.

Step S230 above is a step of acquiring the pronunciation transcription model based on the transfer learning. Here, the pronunciation transcription model may be a model that receives the partial audio signal of the first sound unit from the audio signal split model to perform prediction related to the pronunciation transcription. In other words, the pronunciation transcription model may be acquired by fine-tuning a pre-trained STT model by using the training data for the pronunciation transcription.

According to an exemplary embodiment of the present disclosure, if a structure of the STT model used in the audio signal split model 300 is the same as a structure of a model used in the pronunciation transcription model 400, an initial value of a parameter of the pronunciation transcription model 400 is not used as random value, but transferred to a parameter value of the audio signal split model 300 to perform training. Through this, the pronunciation transcription model 400 may be more rapidly trained. Since the audio signal split model 300 may convert a speech feature into a text by the STT model, if the pronunciation transcription model 400 is acquired by performing the transfer learning based on the audio signal split model 300, required cost may be reduced.

In general, a large amount of training data to train a general ASR or STT model is required to train the pronunciation transcription model, but a pronunciation-transcribed ground truth text is very small, so there is a problem in that it is difficult to acquire training data (a pair of audio and a ground truth text of pronunciation-transcribing the audio). When the pronunciation transcription model is trained as described with reference to FIG. 6, the pronunciation transcription model may be appropriately trained even when the training data for training the pronunciation transcription model is very small.

For example, as described above with reference to FIGS. 3 to 4, when the speech "신동찬입니다" is received by the input module 200, the speech is input into the pronunciation transcription model 400 by the first sound unit through the audio signal split model 300. That is, a unit input into and output from the pronunciation transcription model 400 is comparatively constant, so the complexity of a task for training the pronunciation transcription model 400 deteriorates, and as a result, the pronunciation transcription model 400 may be appropriately trained even with a small amount of training data.

According to an architecture described above with reference to FIGS. 3 to 6, since the operation of the pronunciation transcription model 400 is independent from the audio signal split model 300, if a further enhanced audio signal split model 300 (e.g., an STT model in which a split capability of the audio and the character is enhanced) is shown, it may be possible to replace only the audio signal split model 300 comparatively easily.

As described above, as an exemplary embodiment of a pronunciation transcription method for Korean language, an exemplary embodiment of splitting the audio signal into the syllable unit, and outputting the pronunciation transcription result of the character unit is primarily illustrated and described, but the pronunciation transcription method may also be applied to a foreign language in addition to the Korean language.

Hereinafter, as an exemplary embodiment of a pronunciation transcription method for English, an exemplary embodiment of splitting the audio signal into a word unit, and outputting a pronunciation transcription result of the word unit will be primarily described.

Figure 7:
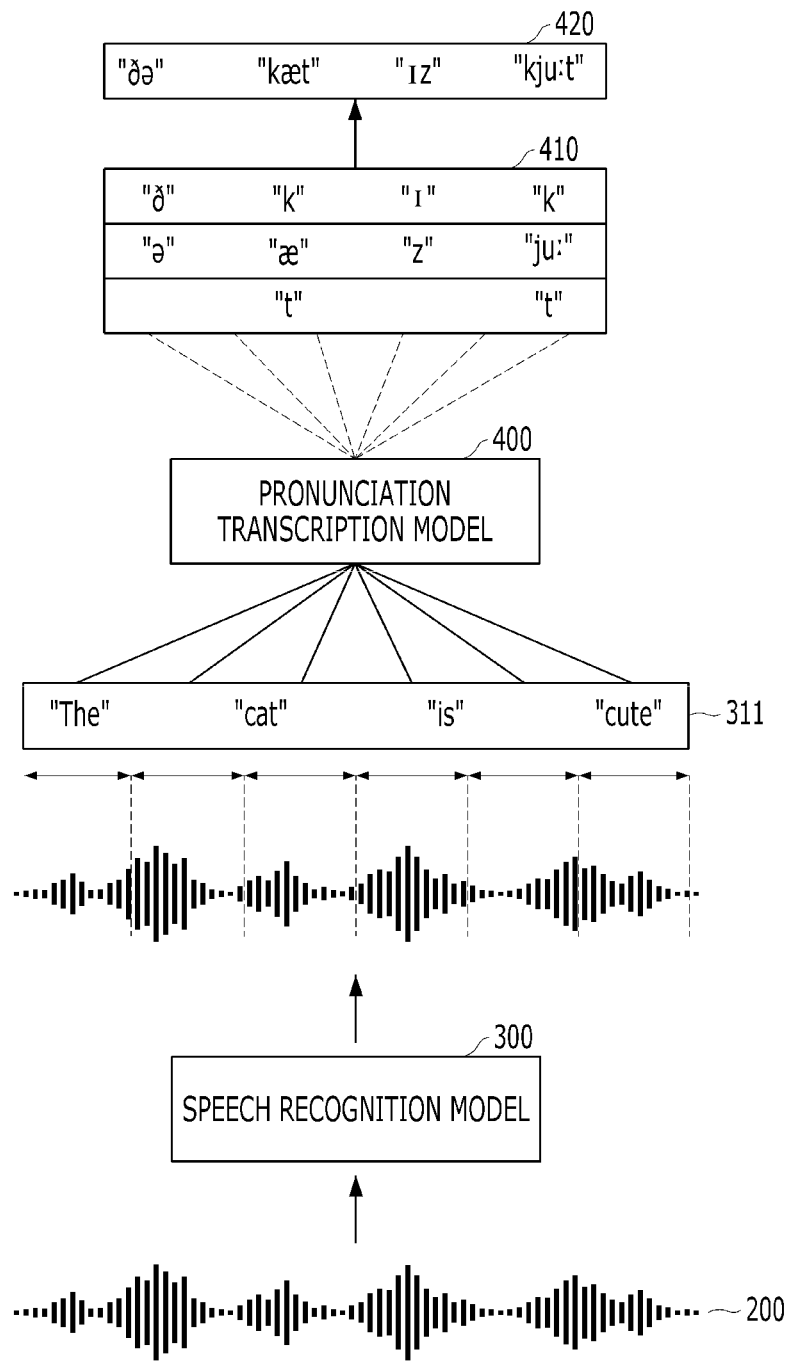
FIGS. 7 and 8 are diagrams schematically illustrating an operation of outputting a pronunciation transcription result by further considering reference information generated from an audio signal split model according to an exemplary embodiment of the present disclosure.
Figure 8:
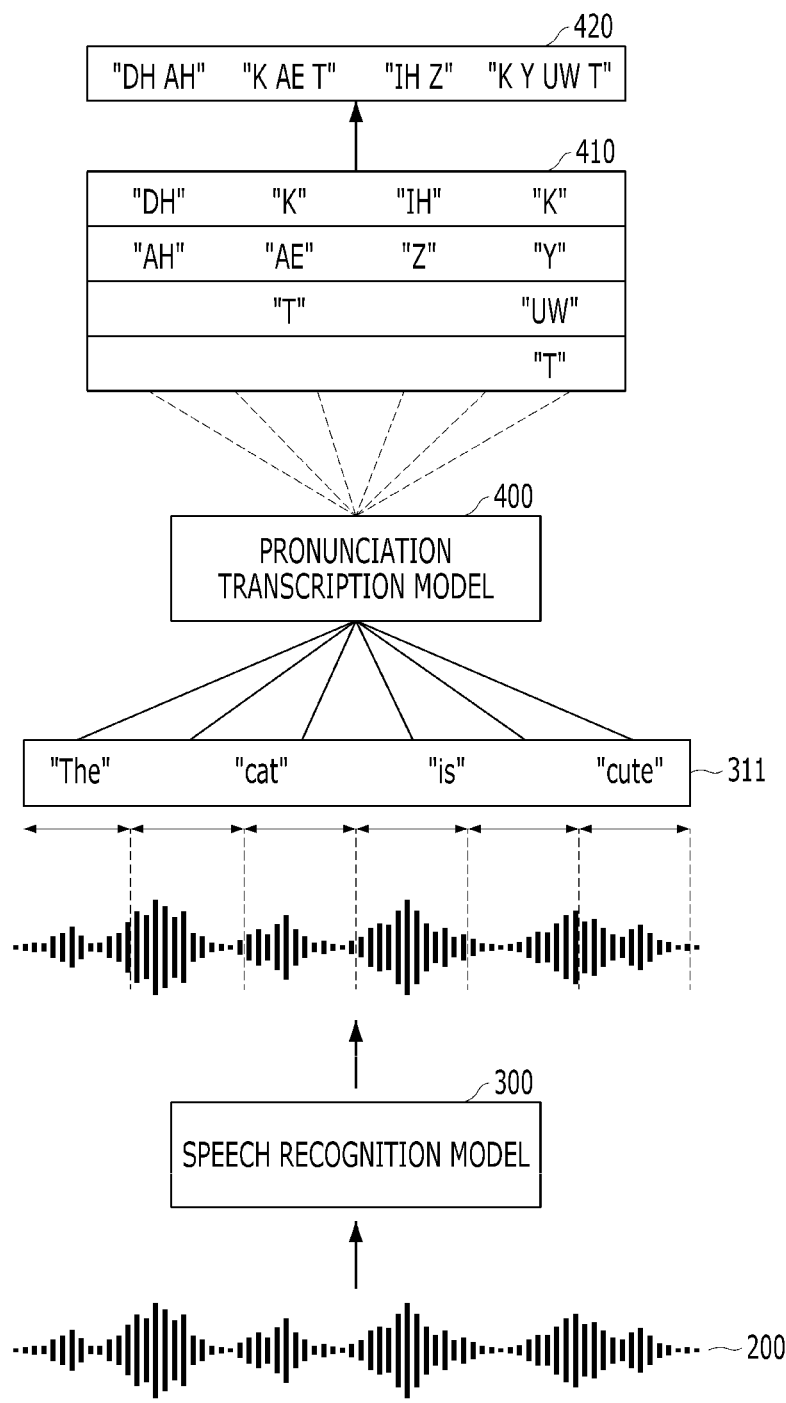

FIGS. 7 and 8 are diagrams schematically illustrating an operation of outputting a pronunciation transcription result by further considering reference information generated from an audio signal split model according to an exemplary embodiment of the present disclosure.

According to the exemplary embodiments disclosed in FIGS. 7 and 8, the pronunciation transcription model 400 may ① "output the pronunciation transcription result by the first sound unit" or ② "perform pronunciation prediction by a second sound unit smaller than the first sound unit with respect to the partial audio signal of the first sound unit, and output the pronunciation transcription result by the first sound unit based on the pronunciation prediction of the second sound unit".

In this case, the pronunciation transcription result of the first sound unit may include speech symbol information of a specific sound unit.

When the spoken speech is written as it is pronounced, English is not expressed in alphabet, but expressed based on a pronunciation symbol unlike Korean expressed in Korean alphabet. An example of a speech symbol system that writes the pronunciation includes International Phonetic Alphabet (IPA), extended Speech Assessment Methods Phonetic Alphabet (X-SAMPA), etc.

There are also various types of International Phonetic Alphabet (IPA), and FIG. 7 illustrates an exemplary embodiment expressed with a pronunciation symbol which is commonly known, and FIG. 8 illustrates an exemplary embodiment of expressing the pronunciation symbol in the form of a complete alphabet form as it is pronounced.

Since the exemplary embodiments of FIGS. 7 and 8 are substantially the same as the exemplary embodiment of FIG. 4 except for the differences, a difference other than a redundant part with the exemplary embodiment of FIG. 4 will be primarily described.

First, referring to FIG. 7, the input module 200 may receive an audio signal. For example, the input module 200 may receive an audio signal of "The cat is cute".

The audio signal split model 300 splits the audio signal to generate the partial audio signal of the first sound unit. The partial audio signal of the first sound unit may include an audio chunk of a specific sound unit. When the first sound unit is the word unit, the partial audio signal of the first sound unit may include an audio chunk of the word unit. The audio signal split model 300 may play a role in assisting pronunciation transcription to be performed by audio chunk corresponding to a predetermined sound unit.

The audio signal split model 300 may output timestamp information associated with the partial audio signal of the first sound unit (e.g., word unit). For example, the audio signal split model 300 uses at least one of feature extraction, a speech-to-text (STT) performing result text, or an audio-character splitter to generate the partial audio signal by distinguishing the STT result text of the STT model and the timestamp of the first sound unit (e.g., word unit) corresponding to the STT result text. For example, the audio signal split model 300 divides the timestamp into (i) 0 to 1 second: a speaking speech corresponding to "The" which is the STT result, (ii) 1 to 2 seconds: a speaking speech corresponding to "cat" which is the STT result, (iii) 2 to 3 seconds: a speaking speech corresponding to "is" which is the STT result, and (iv) 3 to 4 seconds: a speaking speech corresponding to "cute" which is the STT result to generate the partial audio signal.

According to an exemplary embodiment of the present disclosure, the audio signal split model 300 may generate the reference information 311 for the partial audio signal of the first sound unit (e.g., word unit). The audio signal split model 300 may acquire first sound unit-wise STT information (e.g., "sound-level" word-wise "character-level" word information) as the reference information 311 based on the timestamp information.

For example, the audio signal split model 300 performs the STT for the entire audio signal to acquire a text "The cat is cute", and divides the audio signal for each word of the STT result text to acquire the timestamp information for dividing the audio signal for each word (=first sound unit). In other words, the audio signal split model 300 may generate reference information 311 such as (i) reference information of the partial audio signal for 0 to 1 second: text information "The" which is an STT result corresponding to the partial audio signal, (ii) reference information of the partial audio signal for 1 to 2 seconds: text information "cat" which is an STT result corresponding to the partial audio signal, (iii) reference information of the partial audio signal for 2 to 3 seconds: text information "is" which is an STT result corresponding to the partial audio signal, and (iv) reference information of the partial audio signal for 3 to 4 seconds: text information "cute" which is an STT result corresponding to the partial audio signal.

According to an exemplary embodiment of the present disclosure, the pronunciation transcription model 400 may receive "the partial audio signal of the first sound unit (e.g., word)" and "the STT information (reference information) corresponding to the partial audio signal of the first sound unit" from the audio signal split model 300. For example, the pronunciation transcription model 400 may divide and receive the partial audio signal into (i) 0 to 1 second: a speaking speech corresponding to "The" which is the STT result, (ii) 1 to 2 seconds: a speaking speech corresponding to "cat" which is the STT result, (iii) 2 to 3 seconds: a speaking speech corresponding to "is" which is the STT result, and (iv) 3 to 4 seconds: a speaking speech corresponding to "cute" which is the STT result, which are generated by the audio signal split model 300, and receive the partial audio signal. Further, the pronunciation transcription model 400 may receive reference information 311 such as (i) reference information of the partial audio signal for 0 to 1 second: text information "The" which is an STT result corresponding to the partial audio signal, (ii) reference information of the partial audio signal for 1 to 2 seconds: text information "cat" which is an STT result corresponding to the partial audio signal, (iii) reference information of the partial audio signal for 2 to 3 seconds: text information "is" which is an STT result corresponding to the partial audio signal, and (iv) reference information of the partial audio signal for 3 to 4 seconds: text information "cute" which is an STT result corresponding to the partial audio signal.

According to an exemplary embodiment, the pronunciation transcription model 400 additionally uses the STT information (i.e., reference information) generated by the audio signal split model to ① "output the pronunciation transcription result by the first sound unit" or ② "perform pronunciation prediction by the second sound unit smaller than the first sound unit with respect to the partial audio signal of the first sound unit, and output the pronunciation transcription result by the first sound unit based on the pronunciation prediction of the second sound unit".

In this case, the pronunciation transcription result of the first sound unit may include speech symbol information of a specific sound unit. According to an exemplary embodiment, when the first sound unit is the word unit, the pronunciation transcription result of the first sound unit may include speech symbol information of the word unit.

First, the pronunciation transcription model 400 additionally uses the STT information (reference information) generated by the audio signal split model to ① "output the pronunciation transcription result by the first sound unit (e.g. word unit). For example, the pronunciation transcription model 400 may output pronunciation transcription results in order according to the timestamp result output based on the STT performing result text "The cate is cute" in the audio signal split model 300. Specifically, the pronunciation transcription model 400 may output "də" which is the pronunciation transcription result of the word unit by using (i) 0 to 1 second: the speaking speech (i.e., partial audio signal of the word unit) corresponding to "The" which is the STT result and reference information (i.e., text information "The" which is the STT result). Further, the pronunciation transcription model 400 may output "kæt" which is the pronunciation transcription result of the word unit by using (ii) 1 to 2 seconds: the speaking speech (i.e., partial audio signal of the word unit) corresponding to "cat" which is the STT result and reference information (i.e., text information "cat" which is the STT result). Further, the pronunciation transcription model 400 may output "ɪz" which is the pronunciation transcription result of the word unit by using (iii) 2 to 3 seconds: the speaking speech (i.e., partial audio signal of the word unit) corresponding to "is" which is the STT result and reference information (i.e., text information "is" which is the STT result). Further, the pronunciation transcription model 400 may output "kju:t" which is the pronunciation transcription result of the word unit by using (iv) 3 to 4 seconds: the speaking speech (i.e., partial audio signal of the word unit) corresponding to "cute" which is the STT result and reference information (i.e., text information "cute" which is the STT result).

For reference, the reference information (e.g., the STT result of the word unit) generated by the STT model of the audio signal split model 300 and the pronunciation transcription result (e.g., the pronunciation transcription result of the word unit) generated by the pronunciation transcription model 400 are highly related to each other, which may assist the prediction of the pronunciation transcription based on the reference information 311. For example, the reference information 311 may prevent a speech symbol not related from being predicted in the pronunciation transcription model 400, or assists a pronunciation symbol to be output by the pronunciation transcription model 400 to improve the accuracy of the pronunciation transcription. More specifically, when 'is' of "The cat is cute" is taken as an example, at the time of splitting the first sound unit (e.g., word unit), 'is' which is a text corresponding to the speech (according to spelling) will be output from the STT model of the audio signal split model 300, and the pronunciation transcription model 400 will predict 'ɪz' as it is pronounced. Here, when the pronunciation transcription model 400 predicts the speech symbol 'ɪz', 'is' which is the STT result information may be used as a hint, and through this, the accuracy of the pronunciation transcription may be further improved.

The pronunciation transcription model 400 additionally uses the STT information (reference information) generated by the audio signal split model to ② perform the pronunciation prediction by the second sound unit (e.g. phoneme unit) smaller than the first sound unit (e.g., word unit) with respect to the partial audio signal of the first sound unit (e.g., word unit). For example, referring to reference numeral 410, the pronunciation transcription model 400 may predict characters the second sound unit (e.g. phoneme unit) such as "d" and "ə" when receiving the partial audio signal (i.e., 0 to 1 second: the speaking speech corresponding to "The" which is the STT result) corresponding to 0 to 1 second and the reference information (i.e., the text information "The" which is the STT result) based on "The cat is cute" which is the STT performing result text. Further, the pronunciation transcription model 400 may predict characters of the second sound unit (e.g., phoneme unit), such as "k", "æ", and "t" when receiving the partial audio signal (i.e., 1 to 2 seconds: the speaking speech corresponding to "cat" which is the STT result) corresponding to 1 to 2 seconds and the reference information (i.e., the text information "cat" which is the STT result). Further, the pronunciation transcription model 400 may predict characters of the second sound unit (e.g., phoneme unit), such as "ɪ" and "z" when receiving the partial audio signal (i.e., 2 to 3 seconds: the speaking speech corresponding to "is" which is the STT result) corresponding to 2 to 3 seconds and the reference information (i.e., the text information "is" which is the STT result). Further, the pronunciation transcription model 400 may predict characters of the second sound unit (e.g., phoneme unit), such as "k", "ju:", and "t" when receiving the partial audio signal (i.e., 3 to 4 seconds: the speaking speech corresponding to "cute" which is the STT result) corresponding to 3 to 4 seconds and the reference information (i.e., the text information "cute" which is the STT result).

The pronunciation transcription model 400 may output the pronunciation transcription result by the first sound unit (e.g. word unit) based on the pronunciation prediction of the second sound unit (e.g., phoneme unit)". In other words, the pronunciation transcription model 400 may output the pronunciation transcription result by the first sound unit (e.g. word unit) by combining a consonant and a vowel which are the result of the pronunciation prediction of the second sound unit (e.g., phoneme unit). For example, the pronunciation transcription model 400 combines phoneme units predicted as "k", "ju:", and "t" to output the pronunciation transcription result as "kju:t", which is the word unit.

In this case, the pronunciation transcription model 400 may assign a weight in relation to prediction for subsequent consonants and vowels based on prediction for consonants and vowels of the phoneme unit in order to output the pronunciation transcription result by the first sound unit (e.g., word unit) based on the pronunciation prediction of the second sound unit (e.g., phoneme unit)". Further, the pronunciation transcription model 400 may perform the prediction for the consonant and the vowel based on the assigned weight. Additionally, the pronunciation transcription model 400 may output the pronunciation transcription result of the word unit by combining predictions by the phoneme unit.

Meanwhile, the pronunciation transcription model 400 utilizes a dependency relationship between the consonant and the vowel when predicting by the phoneme unit to reduce the complexity of the problem that the model must predict compared to the case of predicting by the word unit. More specifically, since a predicted final unit is determined by phonemes constituting one word ("constant and vowel"), the complexity of the problem which the model must predict may be reduced.

The pronunciation transcription model 400 performs prediction by the second sound unit (e.g., phoneme unit) smaller than the first sound unit (e.g., word unit) to train data regarding combinations which do not appear frequently on a rule base by using data prepared in advance, and may assign a high weight to a consonant or a vowel which is highly likely to appear next by referring to consonant or vowel information which appears previously, thereby performing customizing for a situation in which a specific consonant-vowel combination frequently appears.

According to an exemplary embodiment of the present disclosure, the pronunciation transcription model 400 may finally output the pronunciation transcription result by the first sound unit (e.g. word unit) like "The", "cat", "is", and "cute" based on the pronunciation prediction of the second sound unit (e.g., phoneme unit)" predicted as illustrated in 420.

The exemplary embodiment illustrated in FIG. 8 is different from the exemplary embodiment of FIG. 7 only in the type of pronunciation symbol, and the technical idea described in FIG. 7 may be substantially similarly applied to the exemplary embodiment illustrated in FIG. 8.

The steps mentioned in the above description may be further split into additional steps, or combined into less steps according to an implementation example of the present disclosure. Further, some steps may also be omitted as necessary, and an order between the steps may be changed.

Disclosed is a computer readable medium storing the data structure according to an exemplary embodiment of the present disclosure.

The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection relationship between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an effectively designed data structure, a computing device can perform operations while using the resources of the computing device to a minimum. Specifically, the computing device can increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

Throughout the present specification, a computation model, the neural network, a network function, and the neural network may be used as the same meaning.

Hereinafter, the computation model, the neural network, the network function, and the neural network will be integrated and described as the neural network. The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for training the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for training the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called nodes. The nodes may also be called neurons. The neural network is configured to include one or more nodes.

The data structure may include data input into the neural network. The data structure including the data input into the neural network may be stored in the computer readable medium. The data input to the neural network may include learning data input in a neural network learning process and/or input data input to a neural network in which learning is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include weights of the neural network (weights and parameters may be used as the same meaning in the present disclosure). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network learning process and/or a weight in which neural network learning is completed. The weight which varies in the neural network learning process may include a weight at a time when a learning cycle starts and/or a weight that varies during the learning cycle. The weight in which the neural network learning is completed may include a weight in which the learning cycle is completed. Accordingly, the data structure including the weight of the neural network may include a data structure including the weight which varies in the neural network learning process and/or the weight in which neural network learning is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

FIG. 9 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described herein in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

What is claimed is:

1. A pronunciation transcription method performed by a computing device, the method comprising:
   acquiring a partial audio signal of a first sound unit generated by splitting an audio signal;
   inputting the partial audio signal of the first sound unit into a pronunciation transcription model;
   performing pronunciation prediction by a second letter unit smaller than a first letter unit corresponding to the first sound unit with respect to the partial audio signal of the first sound unit by using the pronunciation transcription model; and
   outputting a pronunciation transcription result by the first letter unit based on the pronunciation prediction of the second letter unit;
   wherein the first sound unit is a syllable unit, first letter unit is a character unit, and the second letter unit is a grapheme unit;
   and wherein the outputting of the pronunciation transcription result by the first letter unit based on the pronunciation prediction of the second letter unit includes:
      assigning a weight in relation to prediction for a subsequent middle or final consonant based on prediction for an initial or middle consonant of the grapheme unit,
      performing the prediction for the middle or final consonant based on the assigned weight, and
      outputting the pronunciation transcription result of the character unit by combining predictions of the grapheme unit.

2. The method of claim 1, wherein the first sound unit is a syllable unit, the first letter unit is a character unit,
   the partial audio signal of the first sound unit includes an audio chunk of the syllable unit, and
   the pronunciation transcription result of the first letter unit includes text information of the character unit.

3. The method of claim 1, wherein the audio signal is split based on an audio signal split model, and
   the audio signal split model performs
   an operation of performing speech-to-text (STT) for the audio signal, an operation of generating the partial audio signal of the first sound unit by splitting the audio signal based on the STT performing result, and an additional operation of generating reference information for the partial audio signal of the first sound unit.

4. The method of claim 3, wherein the outputting the pronunciation transcription result by the first letter unit includes:

outputting the pronunciation transcription result by the first letter unit corresponding to the first sound unit by additionally using the reference information generated by the audio signal split model.

5. The method of claim 3, wherein the reference information includes speech-to-text (STT) information corresponding to the partial audio signal of the first sound unit, and the audio signal split model corresponds to an STT model.

6. The method of claim 5, wherein an output of the audio signal split model includes:

timestamp information associated with the partial audio signal of the first sound unit, and STT result text information corresponding to the partial audio signal of the first sound unit.

7. A method for training a pronunciation transcription model, the method performed by a computing device, the method comprising:

acquiring an audio signal split model generating a partial audio signal of a first sound unit by splitting an audio signal;

performing transfer learning for the audio signal split model by using training data for pronunciation transcription; and acquiring the pronunciation transcription model based on the transfer learning, wherein the pronunciation transcription model is a model that receives the partial audio signal of the first sound unit from the audio signal split model, performs pronunciation prediction by a second letter unit smaller than a first letter unit corresponding to the first sound unit, and outputs a pronunciation transcription result by the first letter unit based on the pronunciation prediction by the second letter unit.

8. A non-transitory computer-readable storage medium having a data structure of a neural network model for pronunciation transcription recorded therein, wherein the neural network model comprises:

an audio signal split model generating a partial audio signal of a first sound unit by splitting an audio signal; and a pronunciation transcription model receiving the partial audio signal of the first sound unit from the audio signal split model and performing prediction related to the pronunciation transcription, wherein the audio signal split model performs:

an operation of performing speech-to-text (STT) for the audio signal, an operation of generating the partial audio signal of the first sound unit by splitting the audio signal based on the STT performing result, and an additional operation of generating reference information for the partial audio signal of the first sound unit, and wherein the pronunciation transcription model is a model that performs pronunciation prediction by a second letter unit smaller than a first letter unit corresponding to the first sound unit, and outputs a pronunciation transcription result by the first letter unit based on the pronunciation prediction by the second letter unit.

9. The non-transitory computer-readable storage medium of claim 8, wherein the audio signal split model includes a speech-to-text (STT) model for generating a partial audio signal of a syllable unit, and the pronunciation transcription model receives the partial audio signal of the syllable unit, and performs prediction by a character unit related to the pronunciation transcription.

10. The non-transitory computer-readable storage medium of claim 9, wherein the STT model outputs the partial audio signal of the syllable unit, and STT information corresponding to the partial audio signal of the syllable unit, and the pronunciation transcription model outputs the prediction by the character unit corresponding to the partial audio signal of the syllable unit by using the partial audio signal of the syllable unit and the STT information.

11. The non-transitory computer-readable storage medium of claim 9, wherein the pronunciation transcription model is acquired by tuning the STT model by using training data for the pronunciation transcription.

\* \* \* \* \*